Aug. 19, 1924.
J. C. TURVENE
1,505,175
TIRE CARRIER ATTACHMENT FOR AUTOMOBILE SPARE TIRE RACKS AND THE LIKE
Filed Jan. 9, 1922
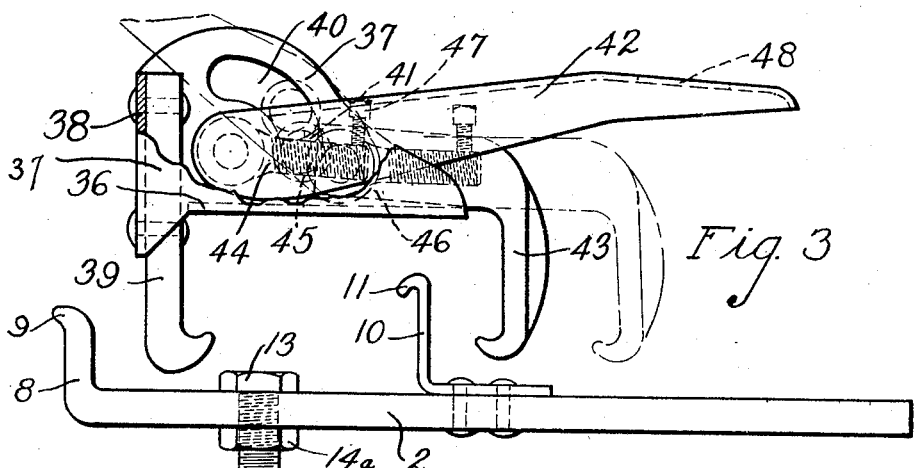
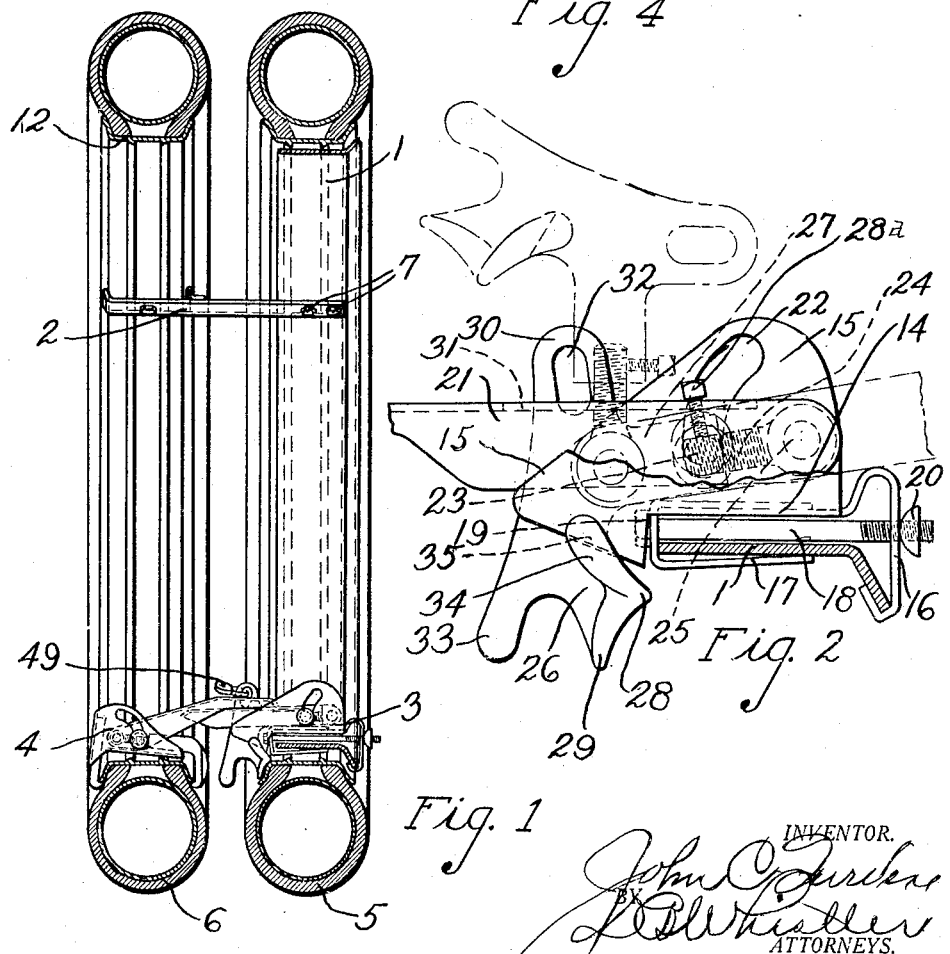
INVENTOR.
John C. Turvene
BY
ATTORNEYS.

Patented Aug. 19, 1924.

1,505,175

UNITED STATES PATENT OFFICE.

JOHN C. TURVENE, OF DAYTON, OHIO.

TIRE-CARRIER ATTACHMENT FOR AUTOMOBILE SPARE-TIRE RACKS AND THE LIKE.

Application filed January 9, 1922. Serial No. 527,876.

*To all whom it may concern:*

Be it known that I, JOHN C. TURVENE, a citizen of the United States, residing at Dayton, in the county of Montgomery and State of Ohio, have invented certain new and useful Improvements in Tire-Carrier Attachments for Automobile Spare-Tire Racks and the like, of which the following is a specification, reference being had therein to the accompanying drawing.

This invention relates to improvements in tire carrier attachments for motor vehicles, having particular reference to an attachment for use in connection with a spare tire carrier which adapts the same for carrying an extra spare tire, means being provided also in connection with the attachment for locking both tires securely on the carrier.

The object of my invention is to provide means for carrying two spare tires on a single carrier, thus to effect a simple arrangement which will have a neat appearance in either case, whether one or two tires are carried.

A further object of my invention is to provide a device of this character suitable for economical manufacturing, that will be effective for holding the tires securely on the carrier, and that cannot easily be broken or otherwise tampered with, thus to insure against loss or theft of the tires.

The invention, as herein shown and described, comprises two units of the tire locking mechanism,—the first unit being either permanently or detachably secured to the tire carrier, and used in connection therewith when either one or two tires are carried,—the second unit being in the form of an attachment which is used only in connection with the first unit when an extra spare tire is carried.

In the accompanying drawings:

Fig. 1 is a view of a tire carrier in vertical cross section, showing the spare tire attachment in side elevation as applied thereto;

Fig. 2 is a detail view of the first unit of the tire locking device used direct on the tire carrier;

Fig. 3 is a detail view of the second unit of the tire locking device used in connection with the first unit and the tire carrier as an atachment, and Fig. 4 is a detail view of an auxiliary bracket of the tire carrier.

As here shown, the tire carrier as a whole, with the attachment of the present invention applied thereto, consists of the rack —1, here shown as representing the well known commercial type of rim rack, the brackets for supporting the rack from the automobile frame not being shown, it being understood that any suitable brackets may be used; brackets —2 secured to rack —1 on opposite sides the vertical center line thereof, and extending outwardly therefrom, aligned one with the other horizontally, and adapted to support an extra spare tire thereon; the first unit —3 and second unit —4 of the locking attachments which will be described presently in detail,—spare tires —5 and —6 being here shown as supported on the carrier.

The brackets —2 are here shown as being detachably secured to rack —1 by means of bolts —7, it being obvious, however, that the brackets can be permanently secured to the rack by riveting one to the other for automobiles regularly equipped for carrying two spare tires. The brackets consist of the main bracket —2 which, as here shown, is a flat or rectangular shaped bar of steel having its outer end turned upwardly as at —8 with an outwardly curved lip or flange —9 formed at the end of the upturned portion. Intermediate the ends of the bar —2 and riveted thereon is an upstanding bracket —10 having its upper end bent outwardly and downwardly toward the end —8 of bar —2 to form flange —11 adapted to hook over the inner edge of the demountable rim —12 of the extra spare tire —6, the outer edge of the rim being adapted to fit snugly over the curved end —9 of bar —2 when the weight of the tire is supported thereon. An adjustable bolt —13 having a lock nut —14ª is provided in bar —2 intermediate the end —8 and bracket —10 to adjust the rim —12 relative to bracket —10 and the curved end —9 of bar —2 to prevent chattering of the rim on the rack when the extra spare tire is carried thereon.

The first unit —3 of the attachment locking devices consists, as best shown in detail Fig. 2, of a base or housing —14 comprising opposite upturned bearing plates —15 and an inwardly and downwardly extended portion —16 forming one member of a clamp which is adapted to hook over the downwardly inclined edge of the rim—bracket —1 of the carrier,—the opposite member of the clamp consisting, as here shown, of a box sleeve —17 which slips under the edge of the rim and over the bottom of the base —14 from the side opposite clamp member —16 and is secured thereto by means of bolts —18 which have their heads —19 enclosed between the outwardly projecting ends of the bearing plates —15 of the base —14, and thus inaccessible when a tire is on the rack, the bolts being threaded at their opposite ends into a lock block —20.

A lever —21 is fulcrumed in cam slots —22 in bearing plates —15 by means of bearing studs —23 which are secured in the opposite sides of lever —21, projecting outwardly through slots —22, and is connected at its short end, by means of a threaded link connection —24, having a head —25, by means of which a pivot bearing connection is formed with lever —21, to an integral clamp member —26, which is secured to link —24 by means of an internally threaded shank —27, the parts being secured in fixed relation one with the other by means of a set screw —28ª, thus providing for axial adjustment of the clamp —26 on link —24 to adapt the same to variable sizes of tire rims. Clamp —26 is further provided with a clamp jaw —28, and a rim flange —29, the jaw being adapted to wedge between the tire and rim, and the flange to contact with the rim when the clamp is adjusted by operating lever —21 to secure the spare tire on the rack. Operation of lever —21 to the left on its pivot center, as shown in Figs. 1 and 2 acts to move member —26 into clamping engagement with the rim of the tire, operation of the lever to the right, as indicated in dotted outline in Fig. 2, acts to disengage the clamp from the rim. When the clamp is closed in its engaged relation with the rim of the tire, as best shown in Fig. 2, a projection —30 of the clamp extends upwardly through a slot —31 of lever —21 to permit of applying a suitable lock, as a padlock, to the clamp by means of an aperture —32 in the projecting end —30, thus serving to interlock the parts one with the other, and to lock the spare tire securely on rack —1. For convenience in adjusting the clamp member —26 to the rim of the tire in the first step of adjustment the clamp is provided with a finger piece —33 whereby the same can be readily manipulated, —and to prevent side play, or lateral displacement of the jaw —28 when the same is in adjusted relation with the tire rim, the jaw is provided on both sides thereof with upwardly extended shoulders —34 which are slotted as at —35 to receive the edges of the bearing plates —15, which act as guides for the jaw as the same is moved into engagement with the rim and, as stated, act to prevent lateral displacement thereof.

The second unit —4 of the attachment locking devices consists of a base housing —36 which comprises opposite side bearing plates —37 and a closed end —38 to which is riveted, as here shown, a downwardly extended, stationary clamp jaw —39. Fulcrumed in opposite cam slots —40 in the bearing plates —37 by means of bearing studs —41 is a clamp lever —42 which has an adjustable clamp jaw —43 connected to its inner end by means of a link —44, the link having a threaded stem —45 adapted to fit into an internally threaded shank —46 of clamp jaw —43, thus providing for axial adjustment of the jaw on the stem to adapt the clamp to tire rims of variable sizes, the parts—jaw —43 and stem —45—being secured in fixed relation one with the other by a set screw —47.

When lever —42 is moved to raised position, as indicated by dotted lines in Fig. 3, the clamp jaws will be spread to release the rim of the tire; when the lever is moved to the opposite position, as indicated by solid lines in Fig. 3, the clamp jaws will be moved to firmly grip the rim of the tire. In the closed position lever —42 by means of a slot —48 formed therein adjacent its outer end, is adapted to receive the projecting end —30 of clamp member —26 of locking unit —3, as illustrated in Fig. 1,—thus providing for securing locking units —3 and —4 interlocked one with the other by means of a single padlock —49.

It will be obvious, of course, from the foregoing detailed description that locking unit —3, when a single spare tire is to be carried, is adapted for use independently of locking unit —4; also that locking unit —4 is adapted to be used independently of locking unit —3, as all that is required to use locking unit —4 in connection with rack —1, or any suitable rack, is means on the rack for interlocking clamp lever —42 therewith.

Having described my invention, I claim:

1. In a tire carrier, including in combination with a tire rack, an attachment comprising a support and connected therewith means for securing said attachment to said rack, a lever having a variable pivot center in said support, and an adjustable clamp pivotally connected to said lever, and adapted upon operation of the lever to be moved into holding engagement with the rim of a tire supported on said rack and in said relation to be interlocked with said lever.

2. In a tire carrier, including in combination with a tire rack, an attachment comprising a support and connected therewith means for securing said attachment to said rack, a lever having a variable pivot center in said support, and an adjustable clamp pivotally connected to said lever, and adapted upon operation of the lever in one direction to be moved into holding engagement with the rim of a tire supported on said rack and in said relation to be interlocked with said lever and upon operation of the lever in the opposite direction to be moved to disengage said rim.

3. In a tire carrier, including in combination with a tire rack, an attachment comprising a support and connected therewith means for securing said attachment to said rack, a lever having a variable pivot center in said support, and an adjustable clamp operably connected to said lever and having a jaw adapted upon operation of said lever to be moved into binding relation between a tire supported on said rack and the rim of said tire and in said relation to be interlocked with said lever.

4. In a tire carrier, including in combination with a tire rack, an attachment comprising a support and connected therewith means for securing said attachment to said rack, a lever having a variable pivot center in said support, and an adjustable clamp operably connected to said lever and variably adjustable relative thereto and adapted upon operation of the lever to be moved into holding engagement with the rim of a tire supported on said rack and in said relation to be interlocked with said lever.

5. In a tire carrier, including in combination with a tire rack, an attachment comprising a bearing support having opposite cam slots therein, and means cooperating with said support for securing said attachment to said rack, a lever pivoted in said cam slots, and an adjustable clamp pivotally connected to said lever, and adapted upon operation of the lever to be moved into holding engagement with the rim of a tire supported on said rack.

6. In a tire carrier, including in combination with a tire rack, an attachment comprising opposite bearing supports having aligned cam slots therein, and means cooperating with said support for securing said attachment to said rack, a lever pivoted in said cam slots between said supports, and an adjustable clamp connected to said lever, and adapted upon operation of the lever to be moved into holding engagement with the rim of a tire supported on said rack.

7. In a tire carrier, including in combination with a tire rack, an attachment comprising opposite bearing supports having aligned cam slots therein, and guides extending therefrom, means cooperating with said support for securing said attachment to said rack, a lever operable in said cam slots between said supports and guides, and an adjustable clamp operably connected to said lever and cooperating with said guides to prevent lateral displacement of said clamp upon operation of the lever to move the clamp into engagement with the rim of a tire mounted on said rack.

8. In a tire carrier, including in combination with a tire rack, an attachment comprising a bearing support and connected therewith a clamp for securing said attachment to said rack, a lever pivoted in said support, and an adjustable clamp pivotally connected to said lever and adapted upon operation of the lever to be moved into holding engagement with the rim of a tire supported on said rack, and means to interlock said lever and said clamp one with the other.

9. In a tire carrier, including in combination with a tire rack, a bracket extended laterally from said rack and adapted to support an extra spare tire thereon, means for securing a tire on said rack, an attachment comprising a bearing support and connected therewith a clamp adapted to be moved into holding engagement with the rim of a tire supported on said bracket, a lever for operating said clamp, and means for interlocking said lever with the first named tire securing means.

10. In a tire carrier, including in combination with a tire rack, a bracket extended laterally from said rack and adapted to support an extra spare tire thereon, means for securing a tire on said rack, an attachment comprising a clamp adjustable to fit tire rims of variable widths, and adapted to be moved into holding engagement with the rim of a tire supported on said bracket, a lever for operating said clamp, and means for interlocking said lever with the first named tire securing means.

11. In a tire carrier, including in combination with a tire rack, a bracket extended laterally from said rack, adjustable to fit tire rims of variable widths and adapted to support an extra spare tire thereon, means for securing a spare tire on said rack, an attachment comprising a bearing support and connected therewith a clamp adapted to be moved into holding engagement with the rim of a tire supported on said bracket, a lever for operating said clamp, and means for interlocking said lever with the first named tire securing means.

12. In a tire carrier, including in combination with a tire rack, a bracket extended laterally from said rack, and adapted to support an extra spare tire thereon, means for securing a tire on said rack, an attachment comprising a bearing support and connected therewith a clamp adapted to be moved into holding engagement with the rim of a tire supported on said bracket, means for operating said clamp, and means for interlocking the same with the tire securing means on said rack.

13. In a tire carrier, including in combination with a tire rack, a bracket extended laterally from said rack, and adapted to support an extra spare tire thereon, means for securing a tire on said rack, an attachment comprising a fixed jaw and a movable jaw adapted to clamp the rim of a tire supported on said bracket, a lever for operating the movable jaw, and means for interlocking said lever with the tire securing means of said rack.

14. In a tire carrier, including in combination with a tire rack, a bracket extended laterally from said rack, and adapted to support an extra spare tire thereon, means for securing a tire on said rack, an attachment comprising opposite bearing supports having aligned cam slots therein, a clamp adapted to be moved into engagement with the rim of a tire supported on said bracket, a lever pivoted in said cam slots and operatively connected to said clamp, and means for interlocking said lever with said rack.

In testimony whereof, I affix my signature.

JOHN C. TURVENE.